United States Patent
Murata et al.

[11] Patent Number: 5,150,293
[45] Date of Patent: Sep. 22, 1992

[54] SMALL ELECTRONIC MEMO DATA STORAGE, DISPLAY AND RECALL APPARATUS

[75] Inventors: Kaoru Murata, Nara; Eichika Matsuda, Yamatotakada, both of Japan

[73] Assignee: Sharp Kabushiki Kaisha, Osaka, Japan

[21] Appl. No.: 539,818

[22] Filed: Jun. 18, 1990

[30] Foreign Application Priority Data

Jun. 20, 1989 [JP] Japan .................. 1-157958
Jun. 30, 1989 [JP] Japan .................. 1-170484
Jun. 30, 1989 [JP] Japan .................. 1-170485

[51] Int. Cl.$^5$ .................. G06F 15/38; G06F 15/20; G06F 00/00
[52] U.S. Cl. .................. 364/419; 364/400; 364/705.06
[58] Field of Search ............ 364/419, 400, 710, 705.06

[56] References Cited

U.S. PATENT DOCUMENTS

| | | | |
|---|---|---|---|
| 4,117,542 | 9/1978 | Klausner et al. | 364/705.06 |
| 4,847,760 | 7/1989 | Yagi | 364/400 |
| 4,912,671 | 3/1990 | Ishida | 364/419 |
| 4,931,926 | 6/1990 | Tanaka et al. | 364/419 |

FOREIGN PATENT DOCUMENTS 59-184932 10/1984 Japan .
61-169961 7/1986 Japan .
62-123550 6/1987 Japan .

OTHER PUBLICATIONS

Timeworks, User's Manual "Data Manager PC", 1984, pp. 45-50.

*Primary Examiner*—Roy N. Envall, Jr.
*Assistant Examiner*—Xuong M. Chung
*Attorney, Agent, or Firm*—Nixon & Vanderhye

[57] ABSTRACT

An improved electronic apparatus such as a so-called electronic memo or data book is disclosed. In the apparatus, a numeric string such as a telephone number can be stored together with two kinds of character strings such as a person name and a company name. The apparatus has a memory for storing a portion of data displayed on a display, and the portion of data can used as a search key in the subsequent search operation. The apparatus allows a user to easily utilize the called results of either a sequential search or a direct search in a subsequent direct search and to change the mode to a sequential search at any desired point during execution of a direct search.

7 Claims, 17 Drawing Sheets

IBN = " " (NULL)

IBN = "A"

IBN = "AB"

Fig. 17A

`NAME?` (display 5)

Fig. 17B

JONES

`JONES_` (display 5a)

Fig. 17C

[ENTER]

`NUMBER?`

`JONES` (5a)
`03-123-4567_` (5b)

Fig. 17E

[ENTER]

`(COMPANY NAME?    )`

Fig. 17F

SHARP

`(SHARP_          )`

Fig. 17G

[ENTER]

`NAME?`

*Fig. 18A*
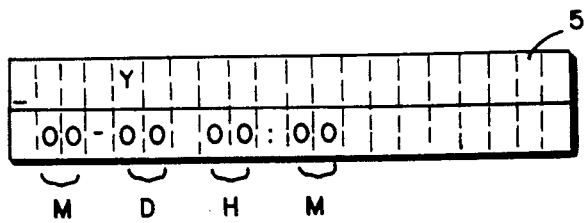
*Fig. 18B*
1989
*Fig. 18C*
10 12
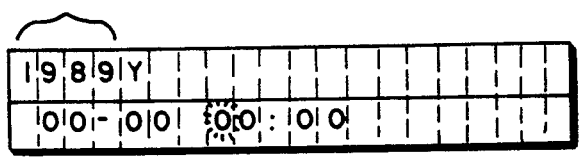
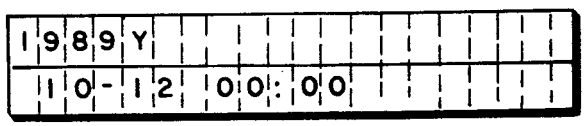
*Fig. 18D*
12 35
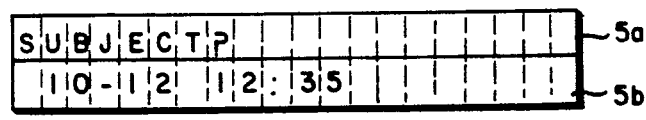
*Fig. 18E*
PARTY
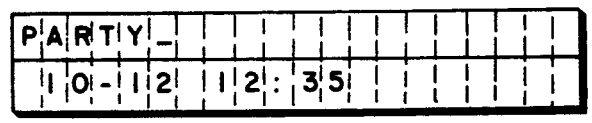
*Fig. 18F*
[ENTER]
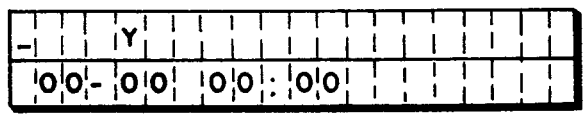
*Fig. 19*
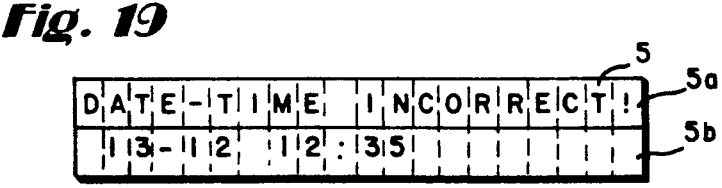

*Fig. 22*

|   | NAME | TEL NUMBER | COMPANY NAME |
|---|------|------------|--------------|
| ① | AMPERE | 01-234-5566 | SUPER COMP CO. |
| ② | BESSEL | 02-345-6787 | SHARP |
| ③ | BROWN | 03-456-7899 | SEMICON CO. |
| ④ | COULOMB | 096-333-4444 | SHARP PA CO. |
| ⑤ | DOPPLER | 055-666-7878 | SOUND ANALYSIS LTD. |

B

[CALL]

DSSTR = "B"

[CALL]

[CALL]

2NDF
+
CALL

DSSTR = " "(NULL)

[CALL]

[NAME/COMPANY]

S

[CALL]

DSSTR= "S"

[CALL]

[2NDF] + [CALL]

DSSTR = "SHARP"

[CALL]

SMALL ELECTRONIC MEMO DATA STORAGE, DISPLAY AND RECALL APPARATUS

BACKGROUND OF THE INVENTION

1. Field of the invention

This invention relates to an electronic apparatus which can store data, and more particularly to a small electronic apparatus such as a so-called electronic memo or electronic data book.

2. Description of the prior art

Recently, small electronic apparatuses which can store various types of information such as telephone numbers and schedule data have been developed. As a typical example of such apparatuses, a so-called electronic memo or electronic data book will be described. When a telephone number of a person is to be entered in an electronic memo, keys are operated so that the name and telephone number of the person are displayed on a display device such as an LCD, and then the name and telephone number are stored in a RAM backed up by a battery. In this way, a many number of combinations of person names and telephone numbers can be stored in the RAM. A company name may be stored instead of a person name. When a telephone number of a person is to be displayed, the name of the person is called on the LCD by operating keys, and then the telephone number of the person is also displayed on the LCD. In an electronic memo, a many number of combinations of a numeric string (such as a telephone number) and a character string (such as a person name, company name) can be written in the RAM, and any one of the combinations can be arbitrarily called. Hereinafter, the term "call" means to read data from a memory and display the data on a display device.

As described above, when data is to be stored in such an electronic memo, keys are operated to display the data to be stored on a display device, and the displayed data is transferred into a memory. Generally, an electronic memo is required to have a reduced size. In an electronic memo, therefore, the size of a display device is restricted. In order to reduce the total size of a display device, it has been proposed that the display device is separated into two sections, one is a dot-matrix type display unit which is suitable for displaying a character string, and the other a seven-segment display unit which is adequate for displaying a numeric string. In an electronic memo having such a two-sectioned display device, when a telephone number is stored, only one of a person name and company name is displayed on the dot-matrix type display unit, and the telephone number on the seven-segment display unit.

In a prior art electronic memo, therefore, a telephone number combined with one of a person name and company name can be stored. In other words, a prior art electronic memo cannot store a combination of a telephone number and two or more character strings. Consequently, the kind of data which can be memorized in combination with a telephone number is restricted. When calling a telephone number, only one of a person name and company name is used as a search key, with the result that it is not easy to call the desired telephone number.

The methods of calling data in such electronic memos of the prior art can be generally classified into the sequential search and the direct search. In the former, data stored in memory are sequentially accessed in the order they have been stored therein. In the latter, for example, a name which is to be used as a search key is input, and then data in memory is searched for a name field which matches the input name, and the searched data is displayed. Electronic apparatuses have been known in which the initial character matching search which retrieves data in the name field beginning with the input name can be performed.

In the direct search, a search key is the data which has been input by a user. While conducting a data call in which one character is used as the search key, it is impossible to change the search key to a character string which begins with another character. Namely, when the contents of a search key are to be modified, the user must input the whole of the new search key.

For data in a prior art electronic memo, either the sequential search or the direct search is performed independently of each other, or the process automatically proceeds to the sequential search mode upon completion of the direct search. Therefore, the user cannot use the results obtained by the sequential search for the direct search, and the user must re-input the name and other search contents again for the direct search. Moreover, when changing from the direct search to the sequential search, the user must wait until the direct search has been completed.

In the majority of prior art electronic apparatuses, the contents of a search key cannot be changed during a direct search. In other electronic apparatuses, the direct search ends automatically when one datum is accessed by the direct search, thereby preventing the user from using the intermediate results in a direct search in subsequent searches. usually, the only way to access all the data stored after a certain datum is to sequentially search the data from beginning to end.

SUMMARY OF THE INVENTION

The electronic apparatus of this invention, which overcomes the above-discussed and numerous other disadvantages and deficiencies of the prior art, comprises a function of storing a plurality of numeric strings, and further comprises, for each of said plurality of stored numeric strings, a first memory means for storing a first character string, and a second memory means for storing a second character string.

The electronic apparatus of this invention may further comprise: a first display means for selectively displaying one of said first and second character strings; and a second display means for displaying a numeric string.

The electronic apparatus of this invention may be designed so that said first display means is a dot-matrix type display device, and said second display means is a segment type display device.

The electronic apparatus of this invention comprises a display means on which data can be displayed, and further comprises: a memory means for storing at least a portion of data displayed on said display means; and a search means for conducting a data search process using said data stored in said memory means.

The electronic apparatus of this invention comprises: a display means on which data can be displayed; and a input means, and further comprises: a first memory means for storing data; a second memory means for storing data which is used as a search key in a data search process; a data call means for, when said data stored in said second memory means is not a null character string, calling data which coincides with at least part of said data stored in said second memory means, and, when said data stored in said second memory means is null, calling said data stored in said first memory means in a predetermined sequence; a first process means for, when said input means is operated in a predetermined manner, storing at least a portion of data displayed on said display means into said second memory means; and a second process means for, when said input means is operated in a further predetermined manner during a data search process, storing a null character string into said second memory means.

Thus, the invention described herein makes possible the objectives of:

(1) providing an electronic apparatus which can store a combination of a numeric string and two or more character strings;

(2) providing an electronic apparatus in which a search key can be easily set during data call; and (3) providing an electronic apparatus which allows a user to easily utilize the called results of either a sequential search or a direct search in a subsequent direct search and to change the mode to a sequential search at any desired point during execution of a direct search.

BRIEF DESCRIPTION OF THE DRAWINGS

This invention may be better understood and its numerous objects and advantages will become apparent to those skilled in the art by reference to the accompanying drawings as follows:

FIGS. 17A to 17G illustrate process of inputting TEL data.

FIGS. 18A to 18F illustrate process of inputting SCHD data.

FIG. 19 shows a display which indicates the data input error.

FIG. 22 shows stored TEL data.

DESCRIPTION OF THE PREFERRED EMBODIMENTS

Figure 1:
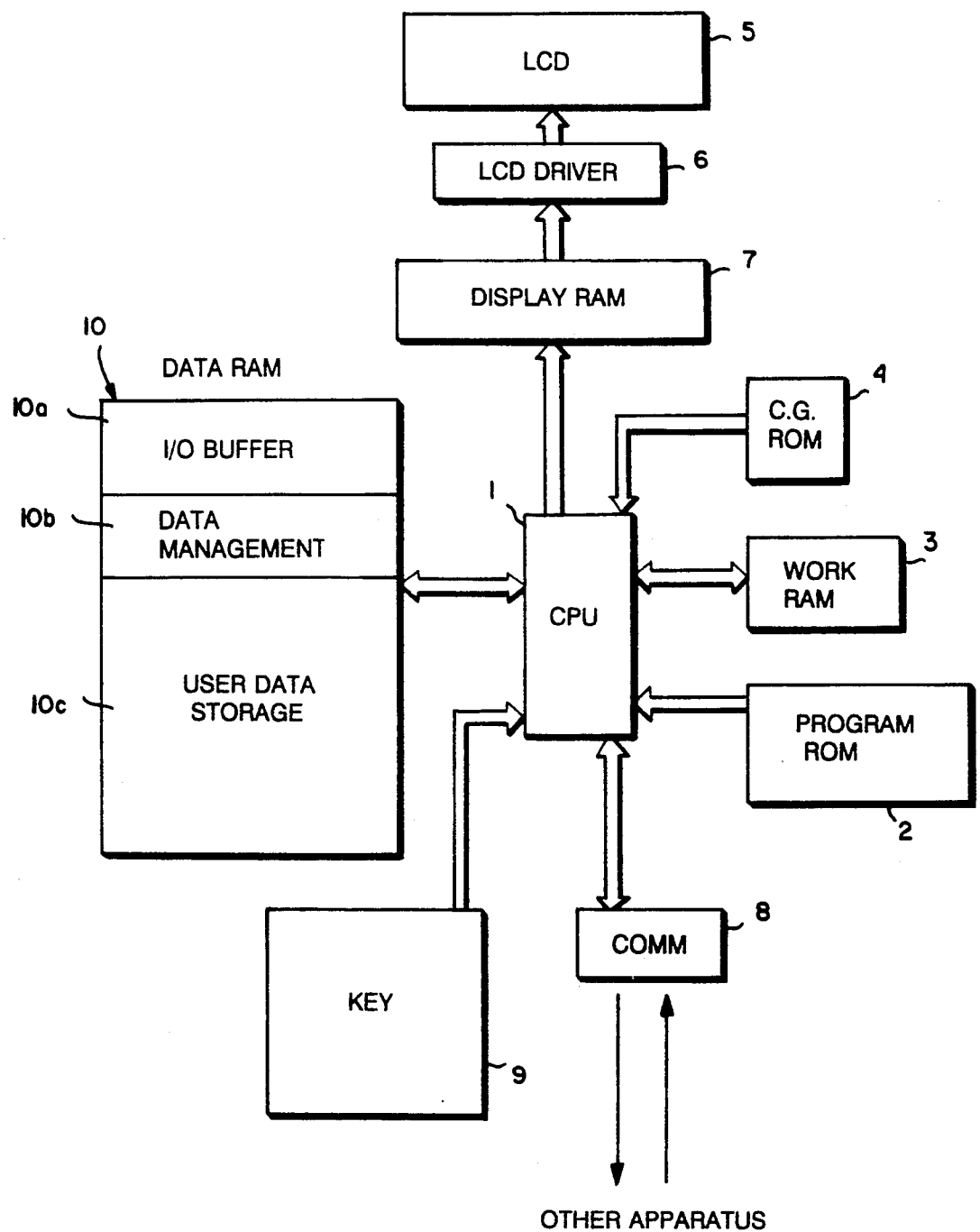
FIG. 1 is a block diagram of an electronic apparatus according to the invention.

FIG. 1 shows an electronic memo according to the invention. This electronic memo has numerous functions, but for the sake of simplicity the following description only deals with a schedule function, a telephone directory function, and a calculator function.

Figure 8:
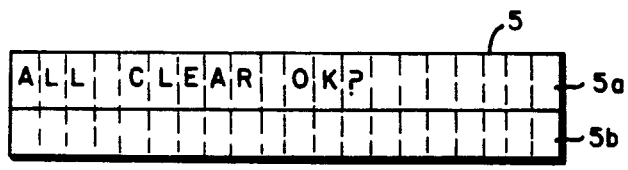
FIG. 8 shows a display in the reset process.

A CPU 1 controls the entire electronic device by executing the program stored in a program ROM 2. A work RAM 3 is a RAM used as the work area when the CPU 1 conducts the control process. A C.G. ROM 4 is a ROM in which character patterns for display are stored. A display section 5 is an LCD having two 20-character display units. As shown in FIG. 8, the upper unit 5a is a dot-matrix type display unit in which one character consists of 5×7 dots, and the lower unit 5b is a 7-segment display unit. An LCD driver 6 converts character patterns in the display RAM 7 into electric signals, and supplies them to the display section 5. Each bit in the display RAM 7 corresponds to one pixel in the display section 5. When the CPU 1 sets a display pattern in the display RAM 7, the display pattern is converted to drive signals for the LCD by the LCD driver 6, which are sent to the display section 5 to drive the LCD of the display section 5.

A communication section 8 sends and receives data to and from other sections. A key section 9 has a number of keys, and it detects key input and relays the result and the type of keys operated to the CPU 1. The types of keys in the key section 9 will be described later. A data RAM 10 stores mainly data entered by the user, and comprises a user data storage section 10c where user data are stored, an input/output buffer 10a where data entered by the user and data retrieved from the user data storage section 10c are temporarily stored, and a data management section 10b which manages data stored in the user data storage section 10c.

Figure 2:
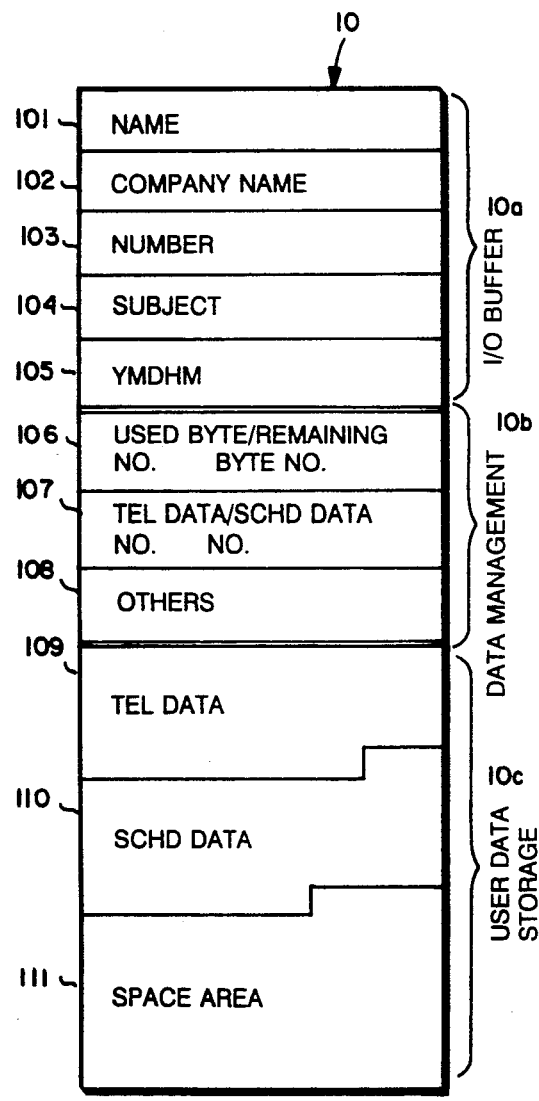
FIG. 2 is a diagram of the memory used in the apparatus.

FIG. 2 shows the data RAM 10 in detail. In this embodiment, the user can enter two types of data; i.e., telephone directory data (referred to as "TEL data") and schedule data (referred to as "SCHD data"). TEL data comprises three parts: name, company name, and number. SCHD data comprises six parts: subject, year, month, day, hour, and minute. The parts from year to minute are indicated by the numeral 105 in FIG. 2. The input/output buffer 10a temporarily stores the contents of each of these parts, and has a name field 101, a company name field 102, a number field 103, a subject field 104, and a year/month/day/hour/minute (YMDHM) field 105. A used byte number/remaining byte number area 106 in the data management section 10b stores the byte number of the areas already used by the user in the user data storage section 10c (i.e., total of byte number of a TEL data area 109 and that of a SCHD data area 110) and the byte number in a space area 111. A TEL data number/SCHD data number area 107 stores the number of data entered as TEL data or SCHD data. The numberal 108 indicates an area for other data necessary to manage the memory. The user data storage section 10c comprises the TEL data area 109 which stores data entered as TEL data, and the SCHD data area 110 which stores data entered as SCHD data. The space area 111 is an unused storage area. Since the length of TEL data and SCHD data is undefined, the number of bytes occupied by each set of data is not set.

Therefore, the TEL data area 109 and SCHD data area 110 are dynamically allocated to allow them to increase or decrease in size as new data is entered or deleted. Data is stored forward in these areas with no space between them. TEL data is sorted in alphabetical order, and SCHD data in the order of the year, month, day, hour and minute in the user data storage section 10c.

Figure 3:
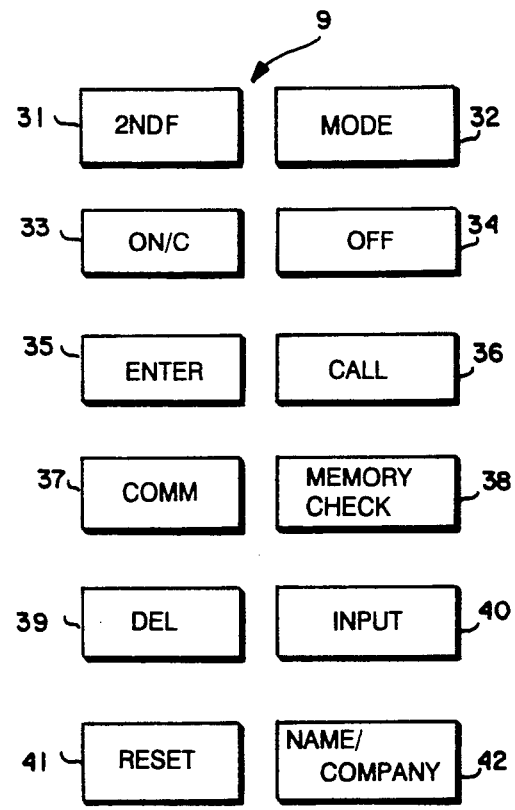
FIG. 3 is a diagram showing keys of the apparatus.

Some of the keys in the key section 9 are shown in FIG. 3. The function of these keys is briefly described below. A 2NDF key 31 is a so-called "second function" key which assigns a second function to the other keys by pressing it before operating the other keys as required. A MODE key 32 is used to select the TEL mode, SCHD mode or CAL mode for execution of the telephone directory function, schedule function or calculator function. An ON/C key 33 functions as a regular ON key when the power is off and as a CLEAR key which resets the display to its original condition when the power is already on. An OFF key 34 cuts off the power to the electronic memo. An ENTER key 5 is used to enter data the user has input in the user data storage section 10c. A CALL key 36 is used to call data entered in the user data storage section 10c and display it in the display section 5. A COMM key 37 is used to communicate with other apparatuses. A MEMORY CHECK key 38 is used to display memory usage. A DELETE key 39 is used to delete input characters and data.

Input keys 40 are a group of keys used for inputting numerals (0-9), characters (A-Z) and symbols (+, −, etc.). A NAME/COMPANY key 2 is used to call data by a company name in the TEL mode. That is, this embodiment has a function to call in the TEL mode the most forward data matching the name and a function to call the most forward data matching the company name, the latter of which is performed using the NAME/COMPANY key 42. A RESET key 41 is used to force the entire system into a certain condition (temporarily referred to as "temporary reset condition"). Unlike the other keys, this RESET key 41 has a direct hardware connection to the CPU 1 so that it can operate the CPU 1 by means of an interrupt regardless of the condition of the CPU 1. That is, other keys cannot supply a signal to the CPU 1 other than when the CPU 1 requests input.

Figure 4:
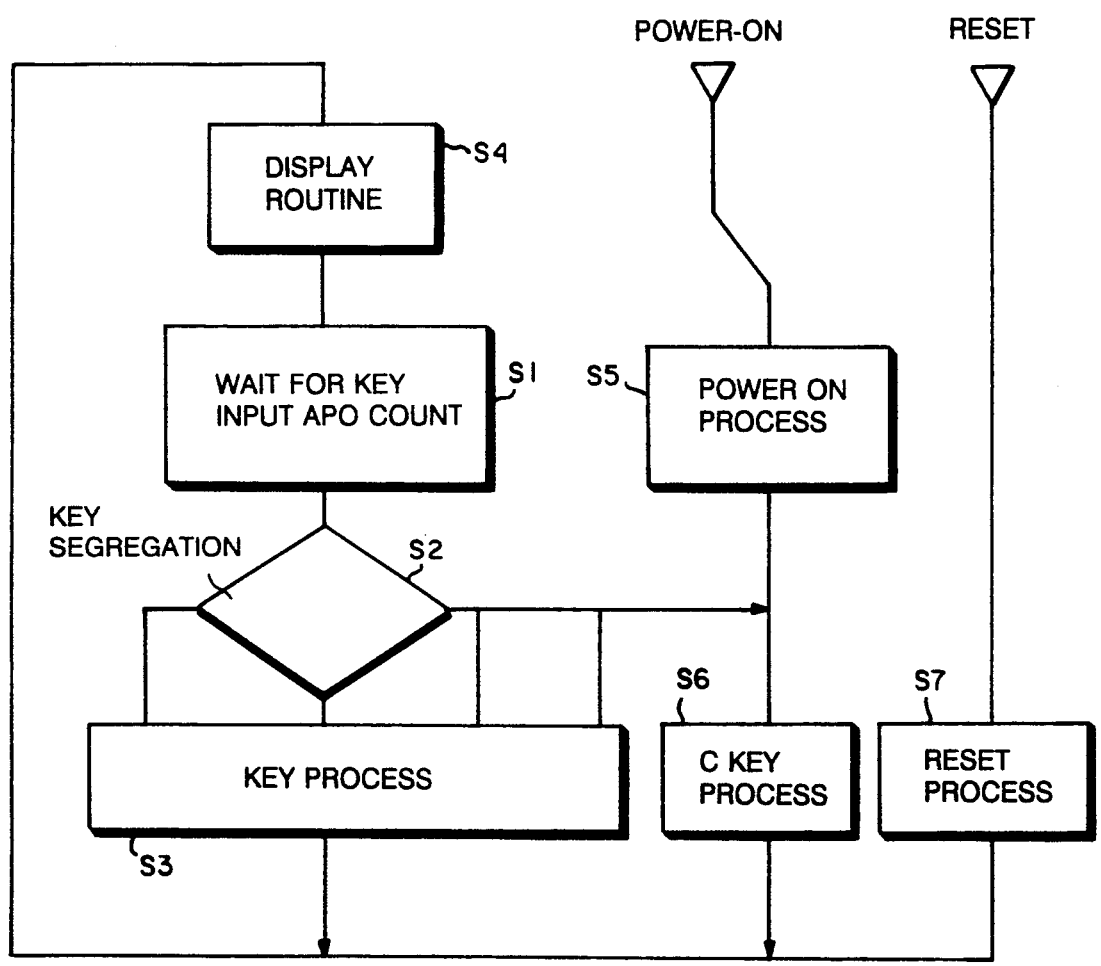
FIG. 4 is a flowchart of the key processes in the apparatus.

FIG. 4 is a flowchart illustrating the operation of the embodiment. First, when the user is not performing any operations on the system, in step S1 the system is in standby while performing the automatic power off (APO) count. If there is no input from any keys for more than a predetermined period, the power is automatically cut off to save the battery. The APO count is a time count for this purpose. When a key is pressed, a signal indicating key input and a code indicating the type of the pressed key are sent from the key section 9. The process progresses to the key segregation (step S2) where the process to be performed is selected according to the type of key pressed. Then, the process corresponding to the pressed key is performed in step S3. In each of the key process routines in step S3, the CPU 1 uses the work RAM 3, the communication section 8 and the data RAM 10 to perform operations according to the contents of the program ROM 2, and then the process progresses to the display routine (step S4).

In the display routine, in order to perform a display at the positions designated by the process routine of each key, the character patterns of the characters to be displayed are obtained from the C.G. ROM 4, and the character patterns are set at the display positions in the display RAM 7. The character patterns set in the display RAM 7 are converted to electric signals got driving the LCD by the LCD driver 6, and display is performed in the display section 5.

Figure 5:
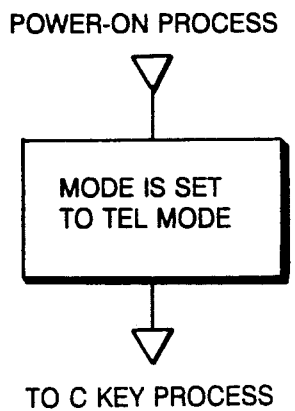
FIG. 5 is a flowchart of the power-on process in the apparatus.

Upon completion of the display process in step S4, flow returns to key standby in step S1 and waits for the next key input. When the ON/C key 33 is pressed while the power is off, flow is forced to start from step S5. Here, the TEL mode is selected as the main mode, and flow progresses to the C key process in step S6 (FIG. 5).

Figure 6:
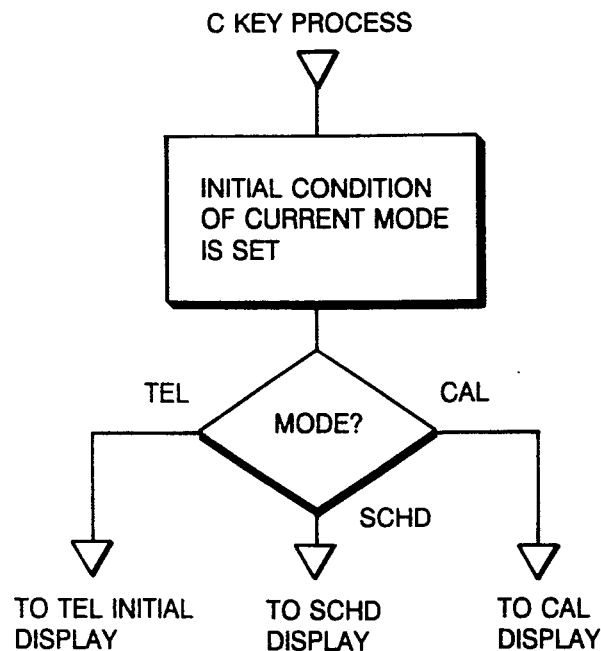
FIG. 6 is a flowchart of the C key process in the apparatus.
Figure 9:
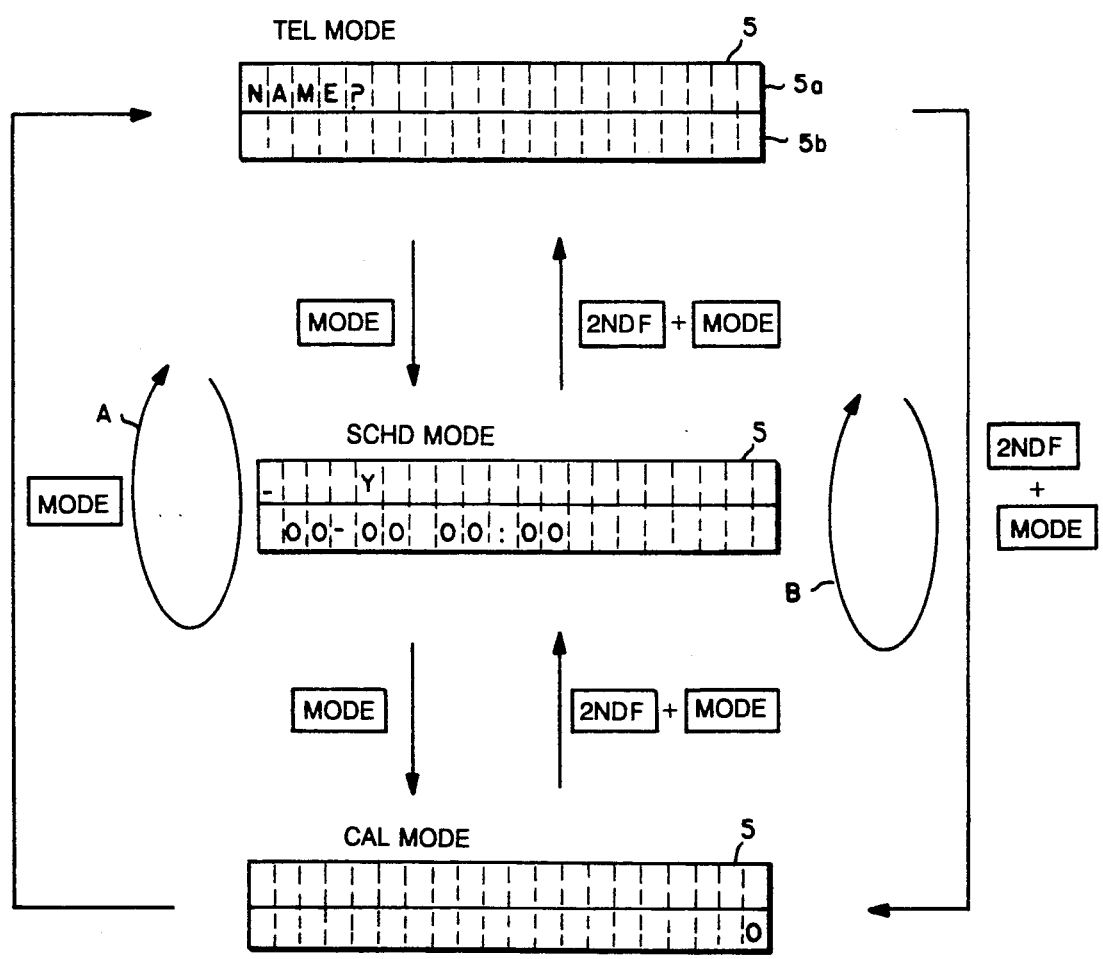
FIG. 9 illustrates the manner of changing the modes in the apparatus.

FIG. 6 shows the flow of the C key process. Here, the initial condition of the currently selected mode is set, after which the display routine corresponding to the selected mode is selected and control changes to that mode. The initial condition of each mode is shown in FIG. 9.

Figure 7:
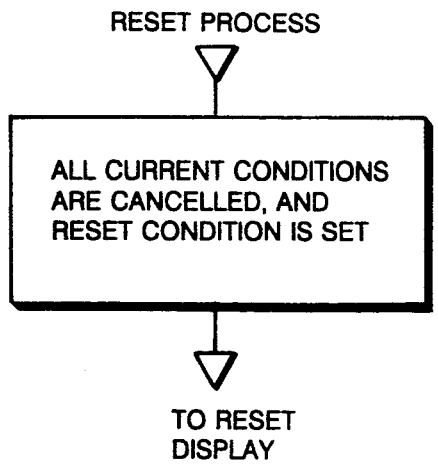
FIG. 7 is a flowchart of the reset process in the apparatus.

When the RESET key 41 is pressed, control moves to step S7 (FIG. 4) regardless of the kind of the current process. As shown in FIG. 7, all current conditions are discarded, and a reset condition is set. Then, the flow moves to the RESET display routine in step S4. The reset display is shown in FIG. 8. In the condition shown in FIG. 8, the user is requested to decide whether or not to erase all of the user data in the data management section 10b and user data storage section 10c of the data RAM 10 and initialize them. When the predetermined key (the ENTER key 35 in this embodiment) which represents YES is pressed, all of the user data is erased. When a key other than the predetermined key is pressed, the data is not erased and initialization is not performed, and flow moves to the C key process (step S6).

The process of each key will be described.

Figure 10:
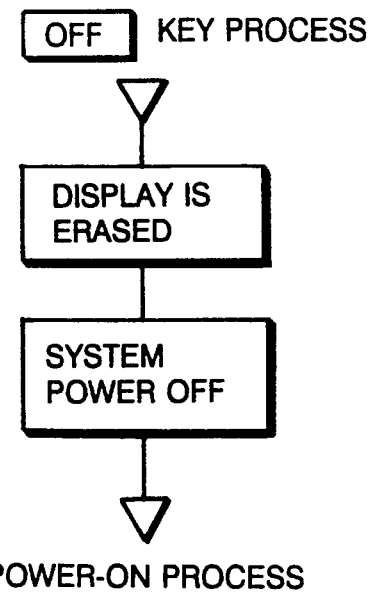
FIG. 10 is a flowchart of the OFF key process.

FIG. 10 shows the process of the OFF key 34. When the OFF key 34 is pressed, the display of the display section 5 is erased, and the power to the system is cut off. This causes the electronic memo to stop operation. However, the data RAM 10 operates on a separate power supply so the user data entered in the data RAM 10 is not lost. Further, after the power to the system is cut off, the program counter in the CPU 1 is set to the POWER-ON process address. By this means, when the ON/C key 33 is pressed, the control starts from the POWER-ON process.

Figure 11:
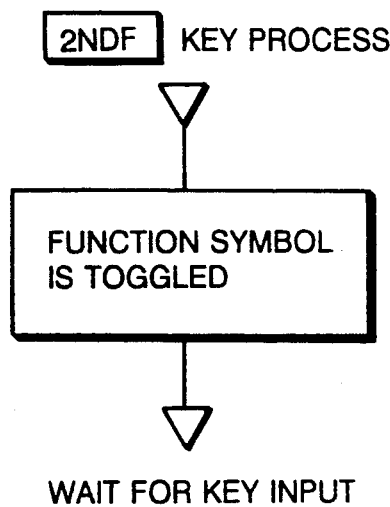
FIG. 11 is a flowchart of the 2NDF key process.

FIG. 11 shows the process flow of the 2NDF key 31. When the 2NDF key 31 is pressed, the display of the 2NDF symbol 13 at the left side of the display section 5 is toggled on and off.

Figure 12:
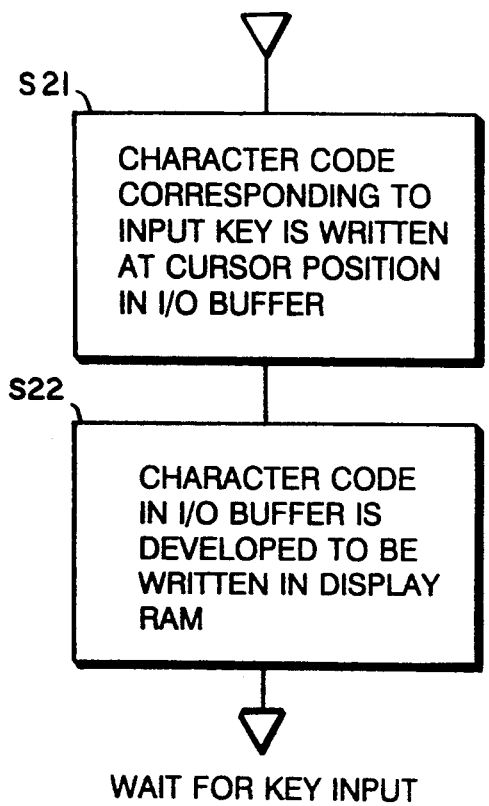
FIG. 12 is a flowchart of the character key process.
Figure 14A:
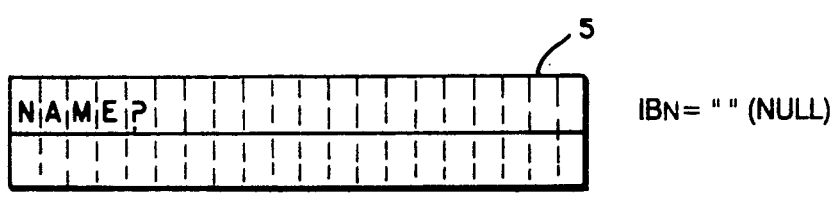
FIGS. 14A to 14C show the manner of inputting a name in a TEL mode of the apparatus.
Figure 14B:
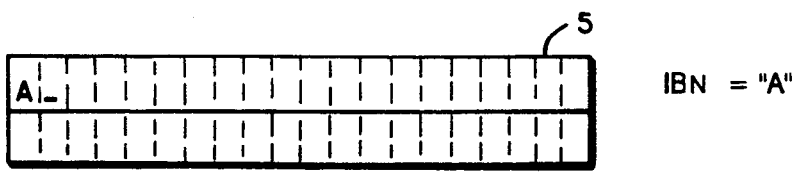
Figure 14C:
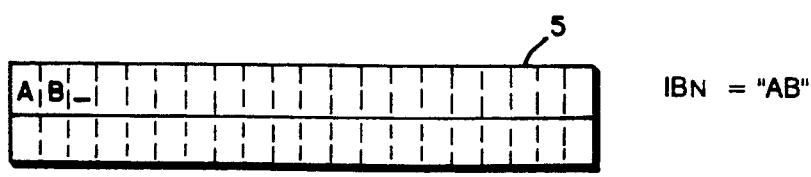

FIG. 12 shows an example of the process of the character input keys 40, and FIG. 14 an example of the character input using the input keys 40. In this embodiment, the input keys 40 comprises 17 keys so that approximately 100 kinds of characters including alphabet, numerals and symbols can be input. When any of the input keys 40 are pressed (step S21), an internal code corresponding to the pressed key is generated. A pointer indicating the current cursor position (position where the character is input) in the work RAM 3 is obtained, and the internal code is written into the position indicated by the pointer in the input/output buffer 10a. The pointer indicating the cursor position used here is initialized when the initial condition of the mode is set, and it increments each time a character is input. Next, in step S22, the process moves to the routine which develops the character code in the input/output buffer 10a into a character pattern using the C.G. ROM 4 and writes it into the display RAM 7 in the same manner as in the display routine (step S4). FIGS. 14A to 14C show an example of the character input from the initial condition of the TEL mode, where $IB_N$ on the right side of the figure indicates the character string being input to the name field in the input/output buffer 10a. FIG. 14A shows the initial display in which $IB_N$ contains nothing; i.e., NULL. When "A" is input using the input keys 40, the character "A" enters $IB_N$ and the display changes as shown in FIG. 14B. Here, the underline bar "_" to the right of the "A" in the display indicates the cursor position (i.e., the position where the next character will be entered). When the character "B" is then input, the character "B" is added to the $IB_N$, and the display changes as shown in FIG. 14C.

Figure 13:
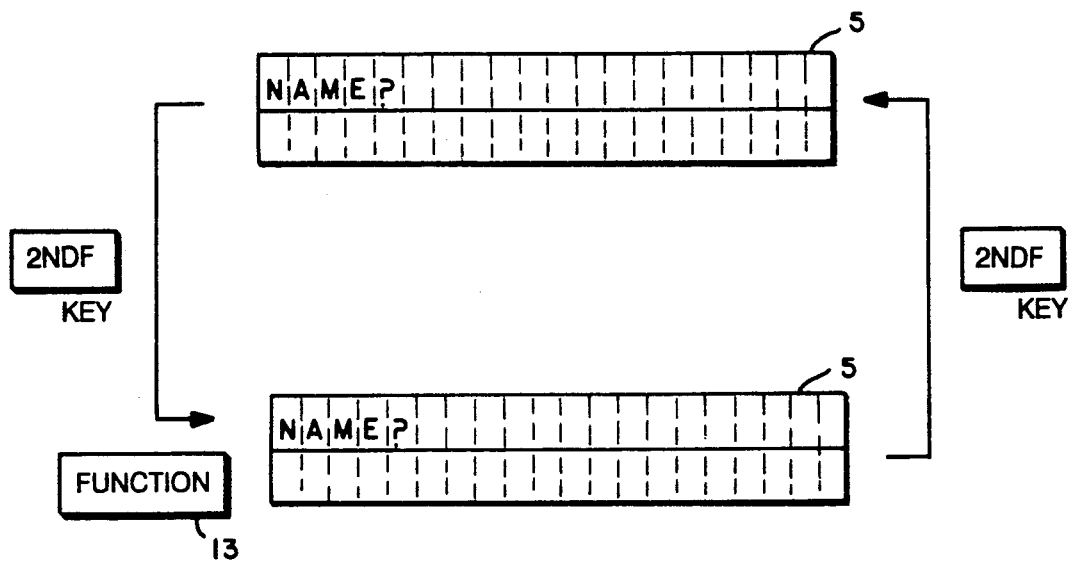
FIG. 13 is a diagram illustrating a FUNCTION symbol.
Figure 15:
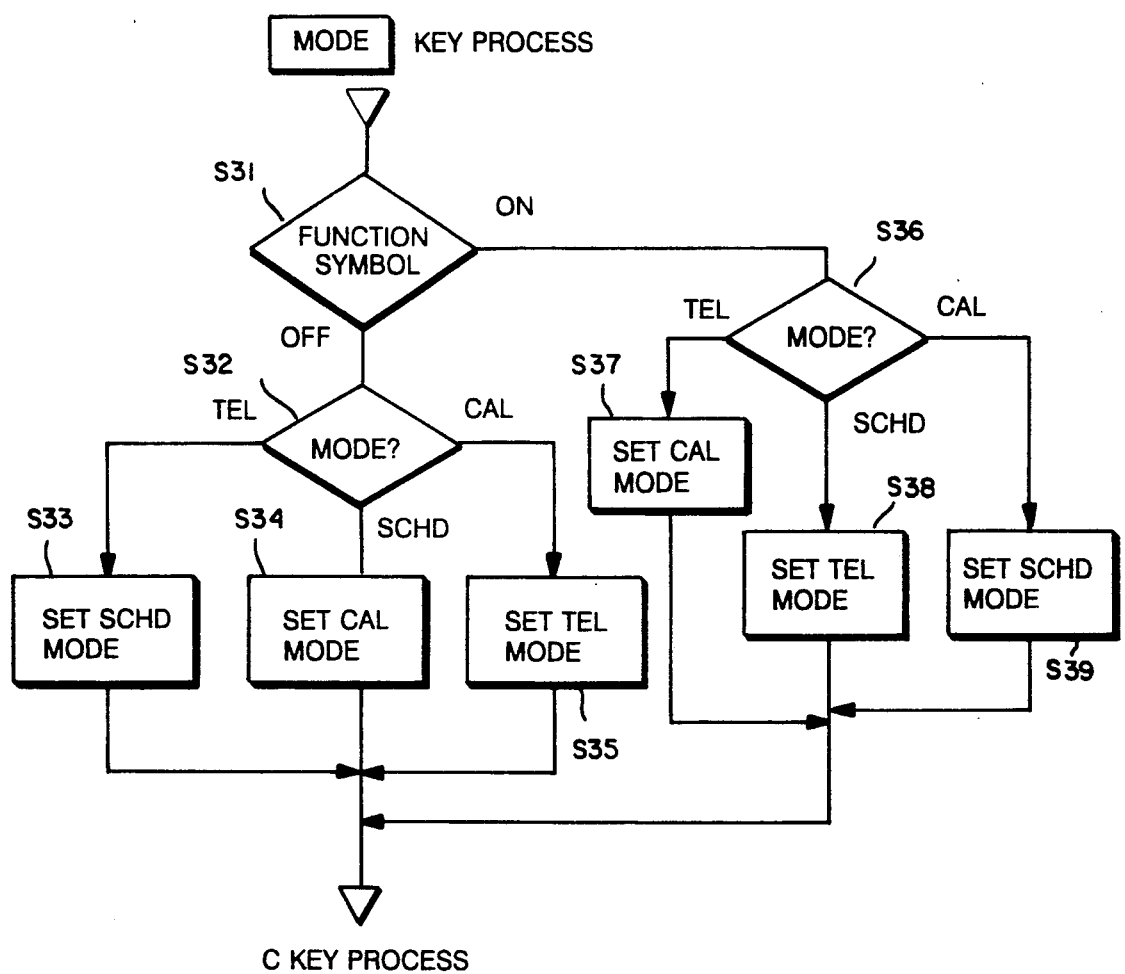
FIG. 15 is a flowchart of the MODE key process.

FIG. 15 shows the process performed when the MODE key 32 is pressed. When the MODE key 32 is pressed, first it is determined whether or not the FUNCTION symbol 13 (FIG. 13) is on or off (step S31). If the FUNCTION symbol 13 is off, the next function mode to be set will depend on the currently set function mode (step S32). That is, if the currently set function mode is the TEL mode, then the SCHD mode is set (step S33), if the currently set function mode is the SCHD mode, then the CAL mode is set (step S34), and if the currently set function mode is the CAL mode, then the TEL mode is set (step S35). Therefore, each time the MODE key 32 is pressed, the mode changes in sequence in a loop as indicated by the arrow A in FIG. 9; i.e., TEL mode→SCHD mode→CAL mode→TEL mode (this order is referred to as "the forward sequence").

When the FUNCTION symbol 13 is on (displayed), the process proceeds to step S36, and if the currently set function mode is the TEL mode, then the CAL mode is set (step S37), if the currently set function mode is the SCHD mode, then the TEL mode is set (step S38), and if the currently set function mode is the CAL mode, then the SCHD mode is set (step S39). Therefore, each time the MODE key 32 is pressed, the mode changes in sequence in a loop as indicated by the arrow B in FIG. 9; i.e., TEL mode→CAL mode→SCHD mode→TEL mode (this order is referred to as "the reverse sequence").

In this way, when the MODE key 32 is operated without pressing the 2NDF key 31, the mode changes sequentially in the forward direction A. When the MODE key 32 is operated after pressing the function key 31, in contrast, the mode changes sequentially in the reverse direction B. Therefore, when changing from the TEL mode to the CAL mode, the CAL mode can be directly set (i.e., without proceeding through the SCHD mode). In this case, the MODE key 32 is required only to be pressed once.

Figure 16:
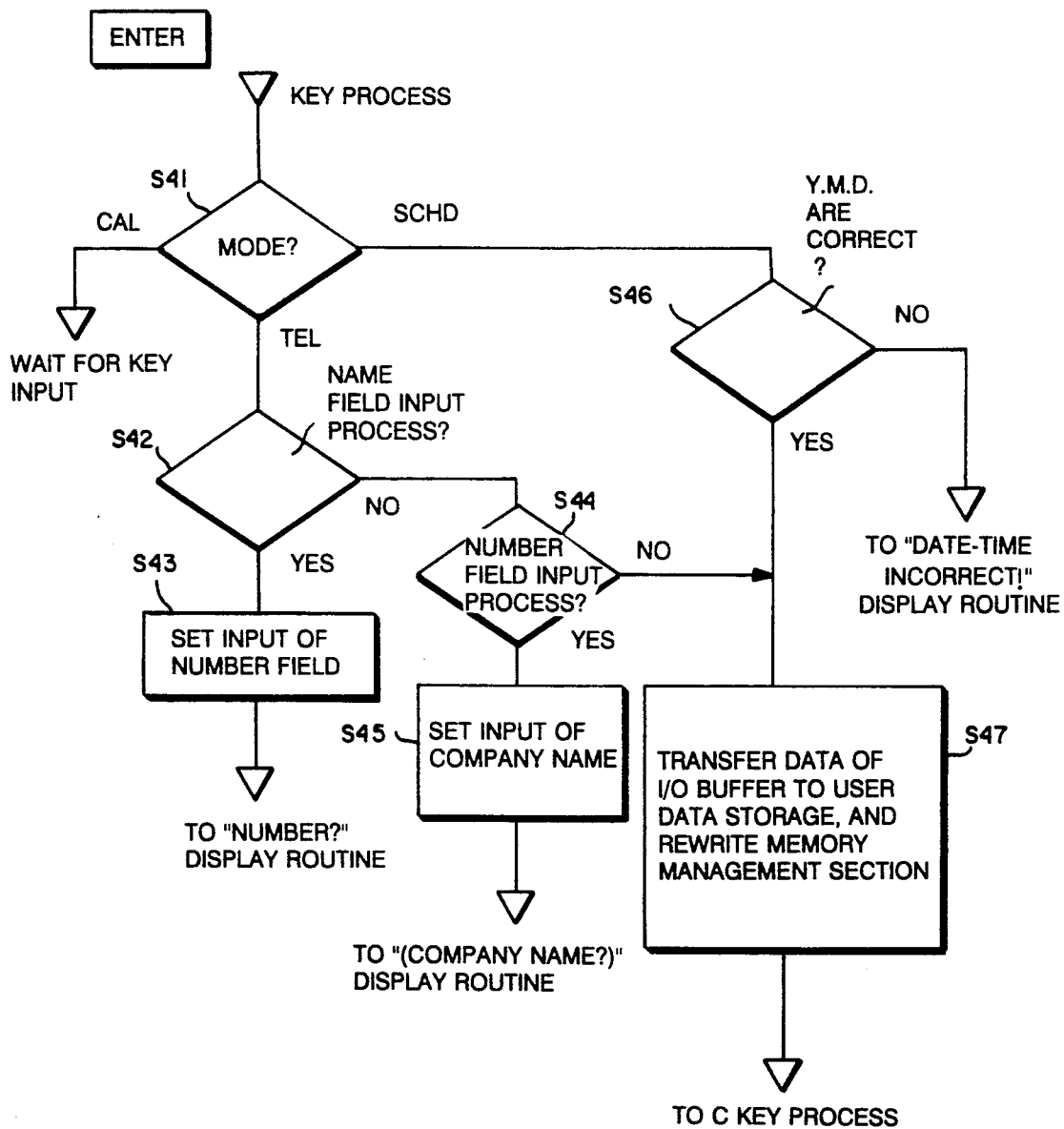
FIG. 16 is a flowchart of the ENTER key process.

The process of the ENTER key 35 is shown in FIG. 16. FIG. 17 shows an example of the procedure by which data is entered using the ENTER key 35 in the TEL mode. In FIG. 17, a character string or numeric string input by operating the ENTER key 35 or the input keys 40 is shown on the left side, and the right side shows the display contents of the display section 5 when this operation or input is performed.

First, for example, when the name "JONES" is input using the input keys 40 in the initial condition shown in (a) of FIG. 17, "JONES" is displayed in the dot-matrix part 5a of the display section 5 ((b) of FIG. 17). Pressing the ENTER key 35 causes the process to proceed to step S41. Since the name is being input, the process proceeds to step S43 where the number input mode is set. The Process then proceeds to the routine which displays "NUMBER?", and "NUMBER?" is displayed in the dot-matrix part 5a of the display section 5 ((c) of FIG. 17). The telephone number for example, "03-123-4567" is input using the input keys 40. The input telephone number is displayed in the segment part 5b of the display section 5 ((d) of FIG. 17).

When the ENTER key 35 is pressed again, the flow proceeds in the order S41→S42→S44→S45 to the routine which sets the company name input condition and displays "(COMPANY NAME?)". As shown in (e) of FIG. 17, "(COMPANY NAME?)" is displayed in the dot-matrix part 5a of the display section 5. The reason why parentheses are used here is to prevent confusion of the company name input condition with the name input condition. The condition in which "SHARP" has been input as the company name is shown in (f) of FIG. 17.

When the ENTER key 35 is pressed in this condition, the flow proceeds in the order S41→S42→S44→S47. The input data "JONES", "SHARP" and "03-123-4567" are temporarily stored in the name field 101, company name field 102 and number field 103, respectively, of the input/output buffer 10a by the character input key process routine shown in FIG. 12. In step S47, these data are transferred to the TEL data area 109 in the user data storage section 10c as TEL data. In this case, the TEL data in the TEL data area 109 is sorted so the names are in alphabetical order (i.e., A-Z-0-9-symbols). Further, after the used byte number/remaining byte number and TEL data number are updated in the data management section 10b, the C key process and initialization are preformed. The input/output buffer 10a is cleared or null.

When calling a telephone number stored in the user data storage section 10c, it can be searched using the name or company name as the search key. The called telephone number is displayed in the 7-segment part 5b, and the name or company name is in the dot-matrix part 5a. When the NAME/COMPANY key 42 is pressed under this condition, the display contents of the dot-matrix part 5a is changed from the name to the company name or vice versa.

FIG. 18 shows the procedure by which SCHD data is entered. In FIG. 18, as in FIG. 17, the character or numeric string input by operating the ENTER key 35 or the input keys 40 is shown on the left side, and the display contents of the display section 5 when this operation or input is performed are shown on the right side. The year, month, day, hour, minute and subject are input from the initial condition shown in (a) of FIG. 18. All of these data are stored in the input/output buffer 10a, and each time a character, etc., is input, the cursor advances automatically. In FIG. 18, (b) shows the input of "1989" for the year, (c) the input of "10"-"12" for the month and day, and (d) the input of "12":"35" for the hour and minute. The year is displayed together with "Y" in the dot-matrix part 5a of the display section 5. The month, day, hour and minute are displayed in the 7-segment part 5b of the display section 5. As shown in (d) of FIG. 18, when the LSD of the minute is input, the year - minute data are temporarily stored in the area 105 of the input/output buffer 10a. The display of the year in the dot-matrix part 5a is cleared, and "SUBJECT"? is displayed in its place. When "PARTY" is input as the subject data, the character string "PARTY" is displayed in the dot-matrix part 5a ((d) of FIG. 18). This subject data is stored in the subject area 104.

When the ENTER key 35 is pressed, the processes in steps S41 and S46 are performed. In step S46, the year-minute data are checked for invalid data (e.g., 13 for the month, 40 for the day, 25 for the hour or 90 for the minute). If invalid data exists, the process proceeds to the "DATE-TIME INCORRECT!" display routine, and "DATE-TIME INCORRECT!" is displayed in the dot-matrix part 5a (FIG. 19). If the year-minute data is correct, the process proceeds to step S47, and the same storage processing as for the above-mentioned TEL data is performed. The SCHD data are sorted by the year, month, day, hour and minute in the SCHD data section 110.

Figure 20:
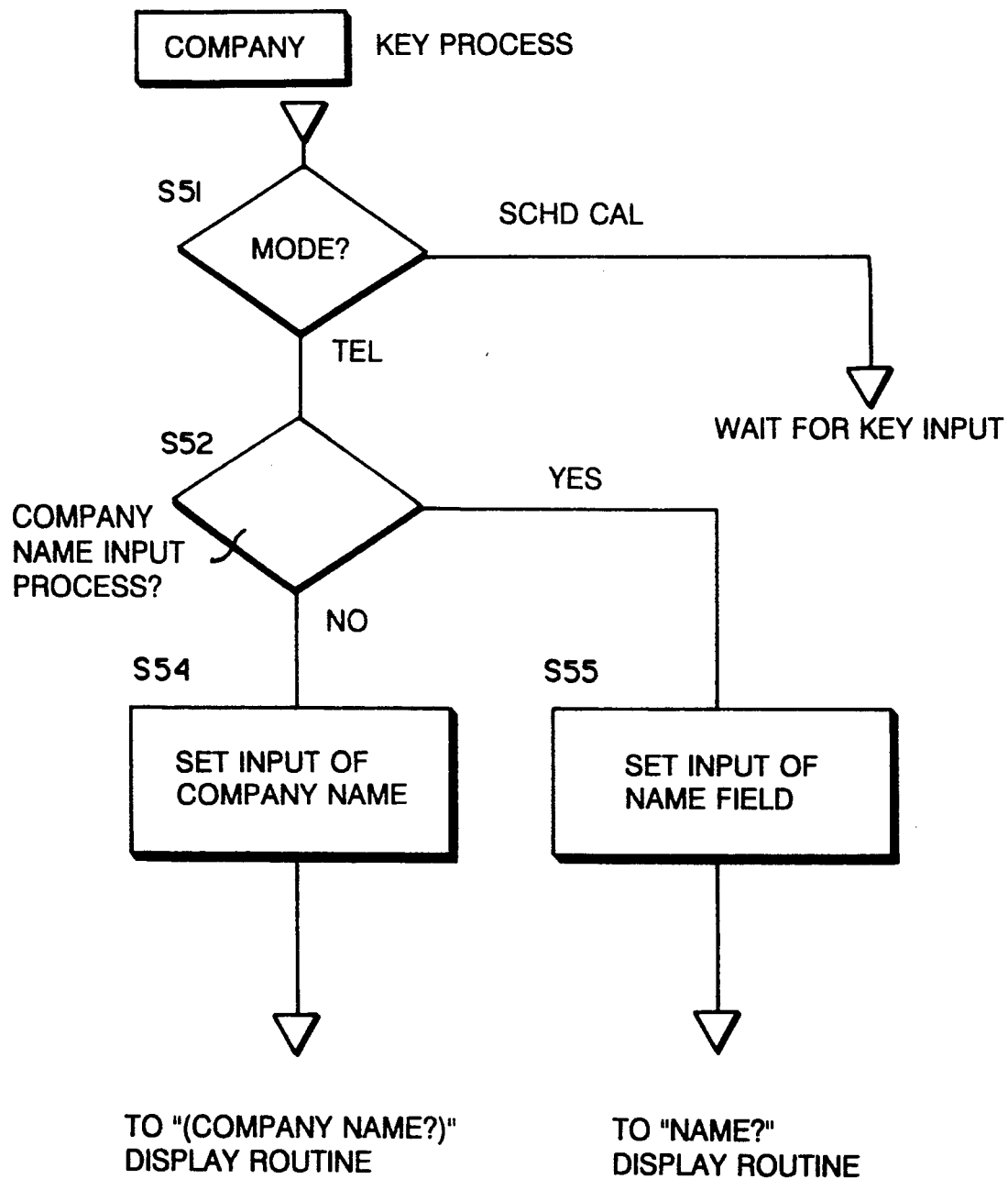
FIG. 20 is a flowchart of the COMPANY NAME key process.

The process of the NAME/COMPANY key 42 is described below referring to FIG. 20. When the NAME/COMPANY key 42 is pressed in the SCHD mode or the CAL mode, the key input standby condition is set (step S51). When the NAME/COMPANY key 42 is pressed in the TEL mode, it is determined in step S52 whether or not the control is in the company name data input mode. If in the company name data input mode, the control goes to the name data input mode in step S55, and the control is passed to the "NAME?" display routine. If not in the company name data input mode, the control goes to the company name data input mode in step S54, and the control is passed to the "COMPANY NAME?" display routine. The transition from the display condition in (a) to that in (b) of FIG. 24 is an example of the effect of the operation of the NAME/COMPANY key 42. FIG. 24 will be described later in detail.

Next, the read-out and display process (i.e., call process) of the entered data is described with reference to FIGS. 21A, 21B, and 22 to 24. The data call can be performed using the CALL key 36, etc. An example is described below in which the call process is conducted against the TEL data entered as shown in FIG. 22.

Figure 21A:
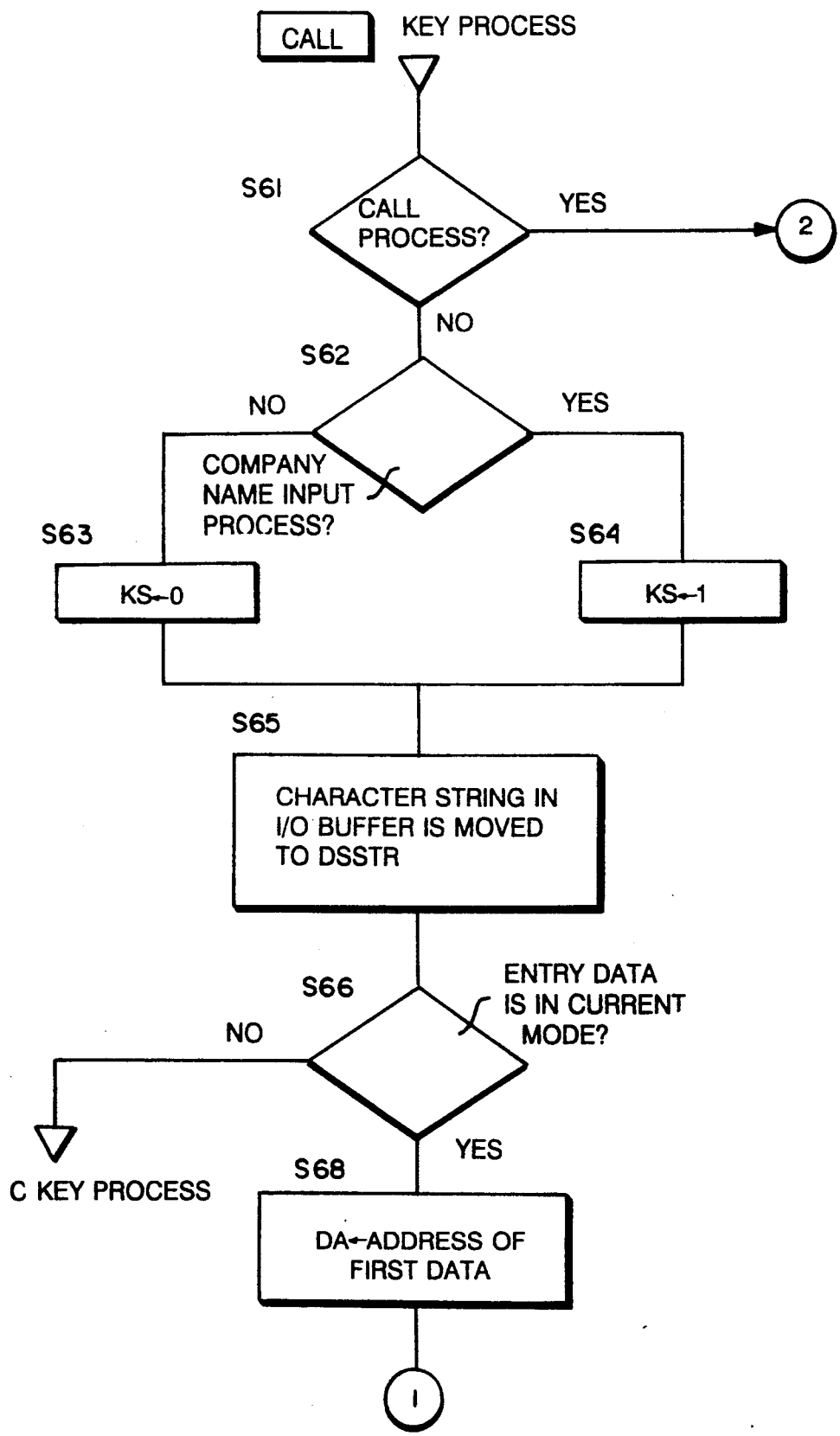
FIGS. 21A and 21B show a flow of the CALL key process.
Figure 21B:
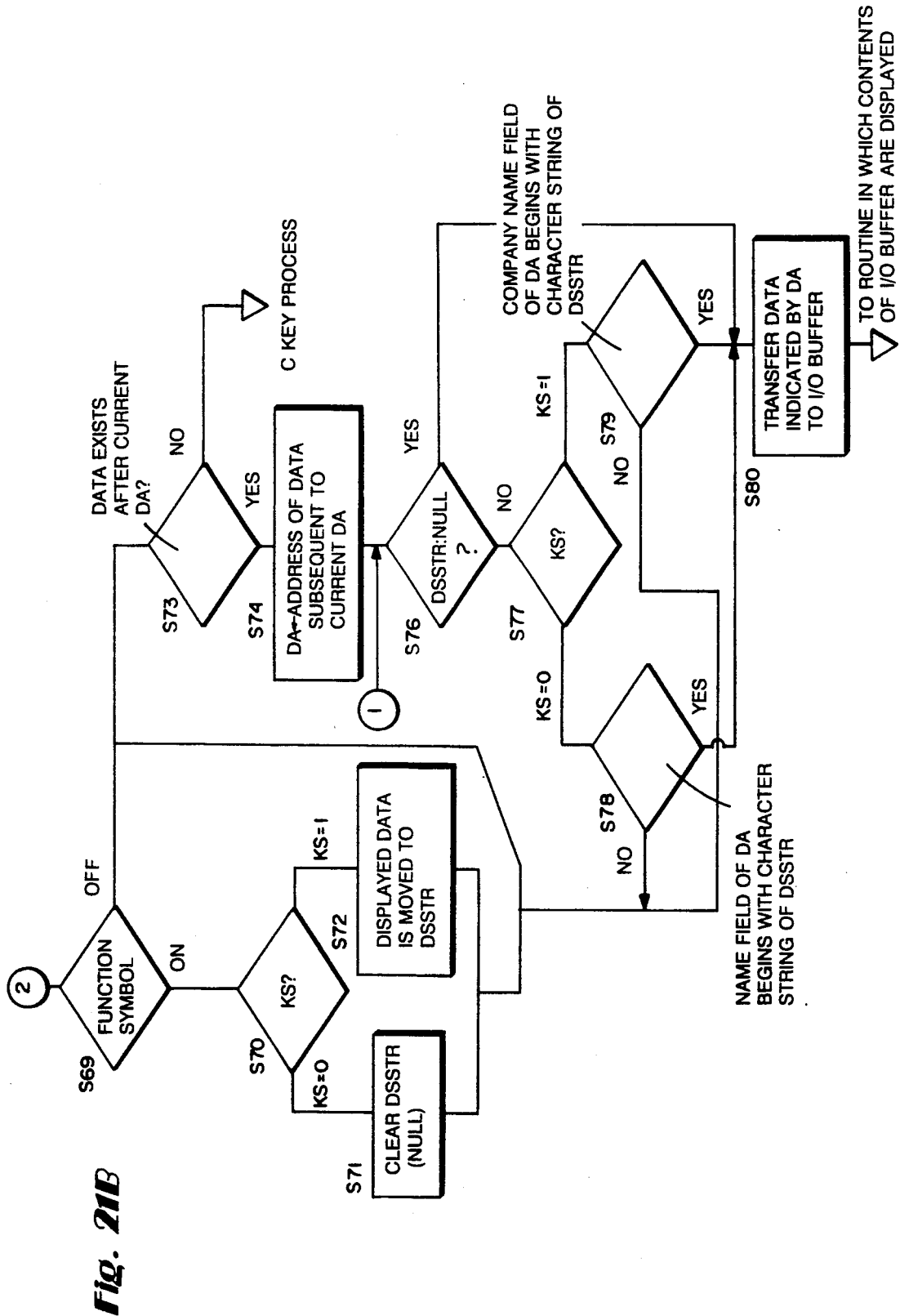
Figure 23A:
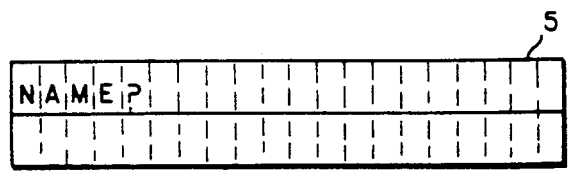
FIGS. 23A to 23G illustrate process of calling TEL data in which a person name is used as a search key.
Figure 23B:
Figure 23C:
Figure 23D:
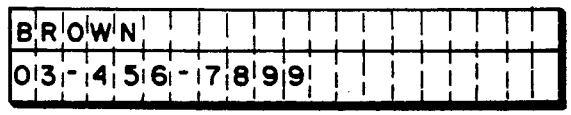
Figure 23E:
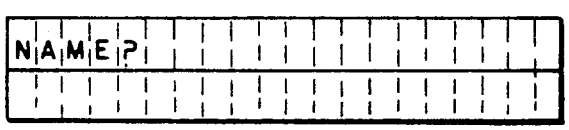
Figure 23F:
Figure 23G:
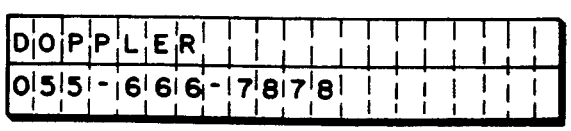
Figure 24A:
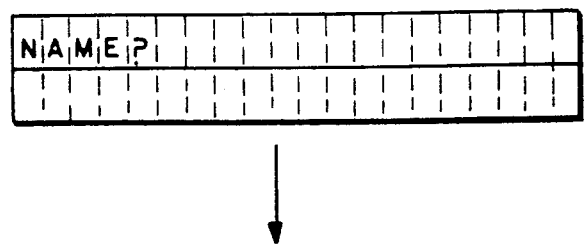
FIGS. 24A to 24G illustrate process of calling TEL data in which a company name is used as a search key.
Figure 24B:
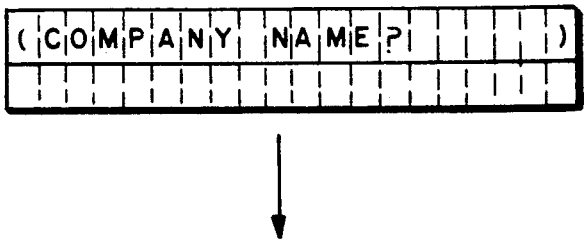
Figure 24C:
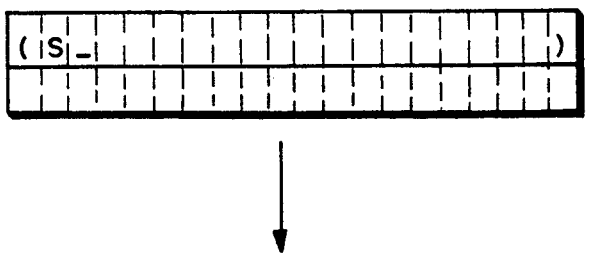
Figure 24D:
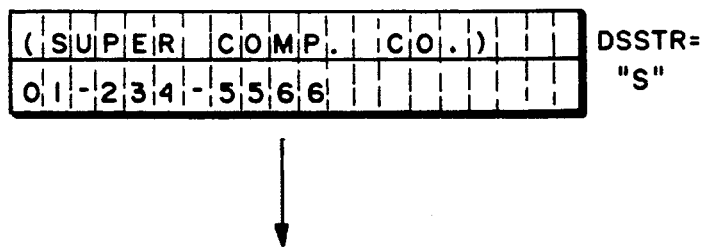
Figure 24E:
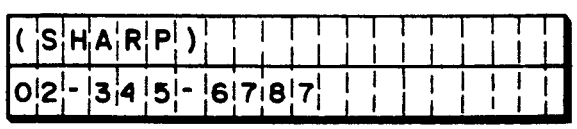
Figure 24F:
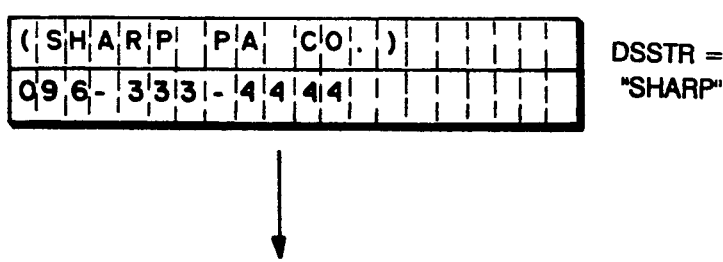
Figure 24G:
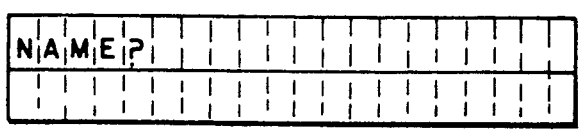

FIGS. 21A and 21B show the process performed when the CALL key 36 is pressed. First, it is determined in step S61 whether or not the call process is being performed. If the call process is not being performed, it is determined is step S62 whether or not the company name input is being performed. If the company name input is being performed, "1" is substituted in the variable KS (step S64), and if the company name input is not being performed, "0" is substituted in the variable KS (step S63). The variable KS is a company name call flag, and when KS=1, it indicates that the call using the input company name as a key is performed. The character string of a name or company name which has been input and is stored in the input-/output buffer 10a is moved to the area designated as DSSTR in the work RAM 3 (step S65). The character string in the area DSSTR is used as a data search key. When no name or company name has been input, the DSSTR is an empty character string (NULL). Then, in step S66, it is checked whether or not there is entry data in the currently selected mode (e.g., TEL mode), and if there is no entry data, the C key process is performed. If there is entry data, the address of the first data in the entry data is set to the pointer DA (step S68), and the process proceeds to step S76.

When it is determined in step S61 that the call process is performed, then it is determined in step S69 whether or not the FUNCTION symbol 13 (FIG. 13) is being displayed (on) or not (off). If off, the process proceeds to step S73. If on, then the value of the variable KS is checked in step S70. If KS=0, the area DSSTR is cleared (step S71), and if KS=1, then the contents of the area DSSTR are updated by moving the character string displayed in the dot-matrix part 5a to the DSSTR area (step S72), after which the process proceeds to step S73. The process performed in steps S71 and S72 is further described below. When a direct search using an input name is performed and the CALL key 36 is pressed while the FUNCTION symbol 13 is on, the direct search is canceled by the process of step S71, and a sequential search is performed. When a direct search using an input company name is performed and the CALL key 36 is pressed while the FUNCTION symbol 13 is on, the displayed character string of the company name becomes as the search key by the processing in step S72.

In step S73, the presence of data subsequent to the data designated by the pointer DA is checked. If there is subsequent data, the address of that data is set to the pointer DA (step S74). If there is no subsequent data, the search process ends, and the C key process is performed.

After the new address has been set to the pointer DA in step S74, it is determined in step S76 whether the area DSSTR is NULL or not. If the area DSSTR is NULL, the data designated by the pointer DA are transferred to the input/output buffer 10a in step S80. If the area DSSTR is not NULL, the value of the variable KS is checked in step S77. If KS=0, it is checked in step S78 whether or not the condition that the contents of the name field of the data designated by the pointer DA start with the character string in the area DSSTR (first characters match) is satisfied. If KS=1, it is checked in step S79 whether or not the condition that the contents of the company name field of the data designated by the pointer DA start with the character string in the area DSSTR (first characters match) is satisfied. When the conditions in steps S78 and S79 are satisfied, the data designated by the pointer DA is transferred to the input/output buffer 10a in step S80. The data transferred to the input/output buffer 10a are displayed by the display routine. If the conditions in steps S78 and S79 are not satisfied, the process returns to step S73, and the next data are searched by the above-mentioned procedure.

FIG. 23 shows an example of the data search procedure in which an input name used as a search key. In FIG. 23, the operated key is shown on the left or right side, and the display resulting from the key operation is shown in the middle. The character "B" is input ((b) of FIG. 23) while the prompt for inputting the name is displayed ((a) of FIG. 23). When the CALL key 36 is pressed, the character string "B" is set in the area DSSTR, and as shown in (c) of FIG. 23, the first TEL data (2) (FIG. 22) having a name field the contents of which start with "B" is displayed. When the CALL key 36 is pressed again, the next TEL data (3) (FIG. 22) having a name field the contents of which start with "B" is displayed ((d) of FIG. 23). When the CALL key 36 is pressed again, since there are no more data having a name field the contents of which start with "B", the search process ends, and the display becomes as shown in (e) of FIG. 23. When the 2NDF key 31 and the CALL key 36 are pressed during the condition shown in (d) of FIG. 23, the area DSSTR is made NULL, and a sequential search is performed. Therefore, the TEL data (4) immediately following the TEL data (3) displayed in (d) of FIG. 23 is displayed ((f) of FIG. 23). In this embodiment, by pressing the 2NDF key 31 and the CALL key 36 during a direct search using the name as the search key, a direct search can be easily canceled, and a sequential search commenced.

FIG. 24 shows an example of the data search procedure in which an input company name is used as a search key. In FIG. 24, the operated key is shown on the left side, and the display resulting from the key operation is shown in the middle. When the COMPANY NAME key 42 is pressed while the prompt for inputting the name is displayed ((a) of FIG. 24), input of the company name is requested as shown in (b) of FIG. 24. The state in which the character "S" has been input is shown in (c) of FIG. 24. When the CALL key 36 is pressed, the character string "S" is set in the area DSSTR, and as shown in (d) of FIG. 24, the first TEL data (1) (FIG. 22) having a company name field the contents of which start with "S" is displayed. When the CALL key 36 is pressed again, the next TEL data (2) having a name field the contents of which start with "S" is displayed as shown in (e) of FIG. 24. When the 2NDF key 31 and the CALL key 36 are pressed, the company name "SHARP" being displayed is set in the area DESTR, and the next TEL data (4) having a company name field the contents of which start with "SHARP" is displayed. When the CALL key 36 is pressed again, since there is no more data having a company name field the contents of which begin with "SHARP", the call process ends, and the display becomes as shown in (g) of FIG. 24. As can be seen from the flowcharts of FIGS. 21A and 21B, it is possible to begin a sequential search of a company name and then switch to a direct search in which the company name obtained in the sequential search is used as a search key.

The above-described procedure wherein, when the 2NDF key 31 and the CALL key 36 are pressed, the displayed character string is set in the area DSSTR may be performed also in a data call process in which a name is used as a search key.

The electronic apparatus according to the invention can store a numeric string together with a plurality of character strings, or can store a combination of one numeric string and two or more character strings. Therefore, the search for a numeric string can be performed easily. When telephone numbers are stored as the numeric strings, the electronic apparatus may be used not only as a telephone directory but also as a business card book. When the first and second character strings are selectively displayed on one display device, the space for displaying the character strings can be reduced in size, thereby enabling a portable electronic apparatus to be constructed in a reduced size. If the invention is applied to an electronic memo having a dot-matrix display and a 7-segment display, either of the first and second character strings can be displayed on the dot-matrix display, and the numeric string on the 7-segment display.

Instead of the company name, other kinds of data such as birthdays and blood types may be stored.

In the apparatus according to the invention, data which has been called and is displayed can be used as the search key in subsequent data call or search processes. According to the invention, it is possible to begin a new data call process using a new search key, in the course of a previous data call process and without conducting the procedure of inputting the new search key. In the apparatus of this invention, data which has been called and is displayed can be used as the search key in subsequent direct searches. Therefore, regardless of whether a sequential search or direct search is being performed, the user can interrupt the search process during data search, and perform data search using the newly set search key without inputting the search key.

When calling data regarding a person of a specific company in the apparatus of the invention which has a telephone directory function and permits the input of company names, the user first calls the data using the first character of the company name as a search key, and when data on persons of the target company are found, the company name being displayed can be used as a search key to simplify the search process. In this way, only data on persons of the target company will be called.

Further, the apparatus of the invention is also effective in searching for data to be used as a search key which has not been correctly remembered. That is, when only the first few characters of the name of the target company have been remembered correctly, only those characters need to be entered as the search key.

According to the invention, the user can execute a sequential search at any point during the execution of a direct search by means of an appropriate key operation.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a small electronic memo data storage, display and recall apparatus capable of storing a plurality of numeric strings in a RAM, said apparatus including, for each of said stored numeric strings,
   a first associated but separately addressable portion of said RAM for storing a first character string related to and associated with each stored numeric string, and
   a second associated but separately addressable portion of said RAM for storing a second character string also related to and associated with each stored numeric string.

2. A small electronic memo data storage, display and recall apparatus as in claim 1, wherein said apparatus further comprises:
   a first display means for selectively displaying one of said first and second character strings stored in said RAM; and
   a second display means for displaying said stored numeric string which corresponds to the displayed character string.

3. A small electronic memo data storage, display and recall apparatus as in claim 2, wherein said first display means is a dot-matrix type display device, and said second display means is a segment type display device.

4. In a small electronic memo data storage, display and recall apparatus comprising a RAM and a display means on which data stored in the RAM can be selectively displayed, said apparatus including:
   a recall means for selectively recalling said data stored in the RAM;
   a search memory means for storing at least a portion of the data stored in said RAM as said data is recalled by said recall means and displayed on said display means; and a search means for conducting a data search process for other data stored in said RAM using said recalled and displayed data as previously stored in said search memory means as search criteria.

5. In a small electronic memo data storage, display and recall apparatus comprising a display means on which stored data can be selectively displayed; and an input means for inputting data which is to become part of said stored data or which is to be searched for in a data search process of said stored data, said apparatus including:

a first memory means for storing said stored data;

a second memory means for storing said input data which is used as a search key in said data search process;

a data call means coupled to said first and second memory means for, when said data stored in said second memory means is not a null character string, calling data from the first memory means which coincides with at least part of said data stored in said second memory means, and, when said data stored in said second memory means is null, calling said data stored in said first memory means in a predetermined sequence;

a first process means coupled to said first and second memory means and to said data call means for, upon receipt of a first predetermined input sequence from said input means, storing at least a portion of data displayed on said display means into said second memory means; and a second process means also coupled to said first and second memory means and to said data call means for, upon receipt of a second predetermined input sequence from said input means, storing a null character string into said second memory means.

6. A method for selectively accessing one of a plurality of numeric strings stored in an electronic memory correspondingly related to a plurality of separately addressable related character strings stored in said electronic memory, said method comprising the steps of:

(i) searching at least one set of related character strings using a first search criteria, and (ii) selectively continuing to search at least one set of said related character strings using a second search criteria, wherein said second search criteria includes data recalled as a result of step (i).

7. Apparatus for selectively accessing one of a plurality of numeric strings stored in an electronic memory correspondingly related to a plurality of separately addressable related character strings, said apparatus comprising:

(i) means for searching at least one set of said related character strings using a first search criteria, and (ii) means for selectively continuing to search at least one set of said unrelated character strings using a second search criteria, wherein said second search criteria includes data recalled by said means for searching.

* * * * *